INVENTOR.
EDWARD T. BOSTONIAN
BY
ATTORNEYS

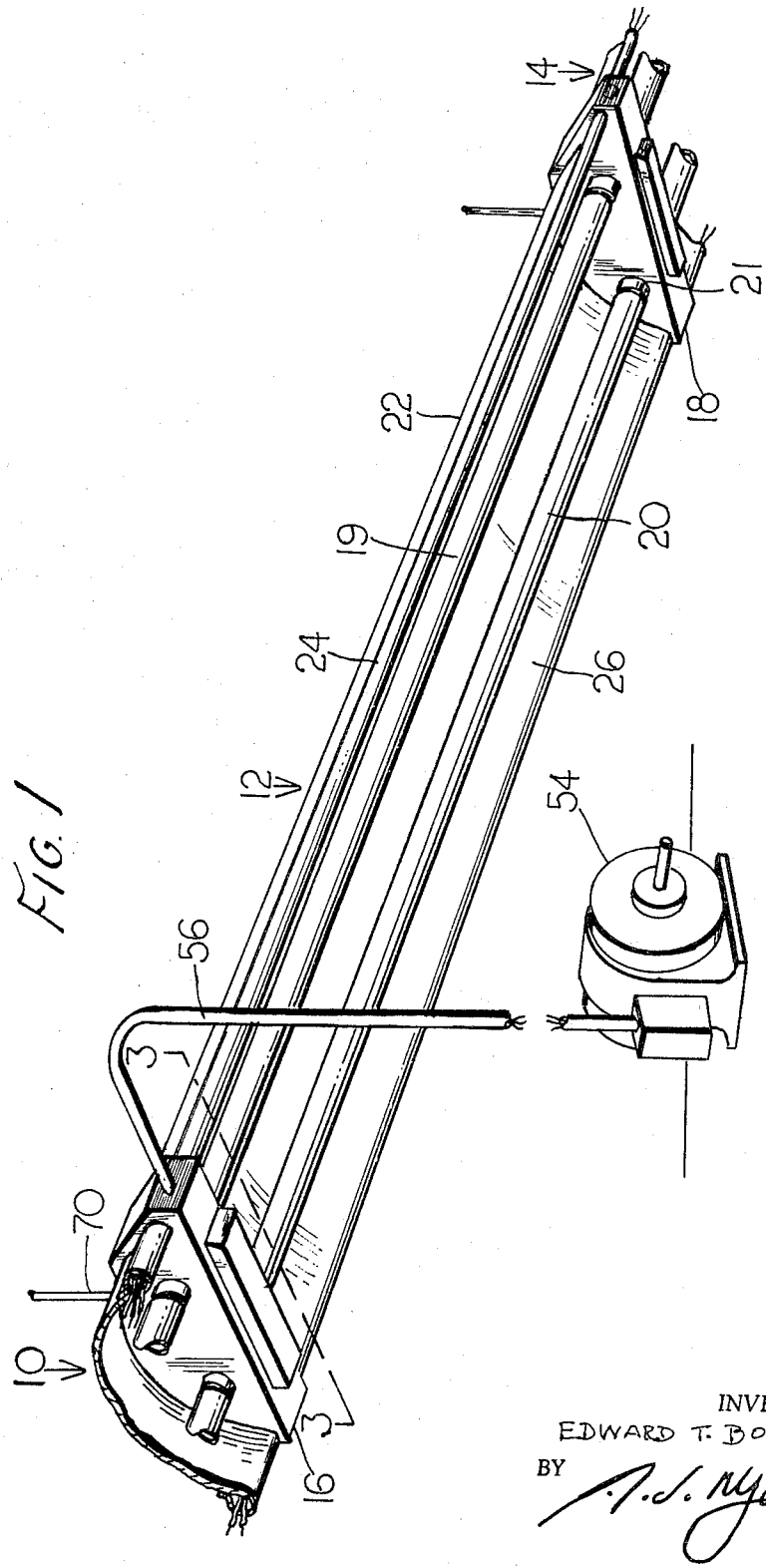

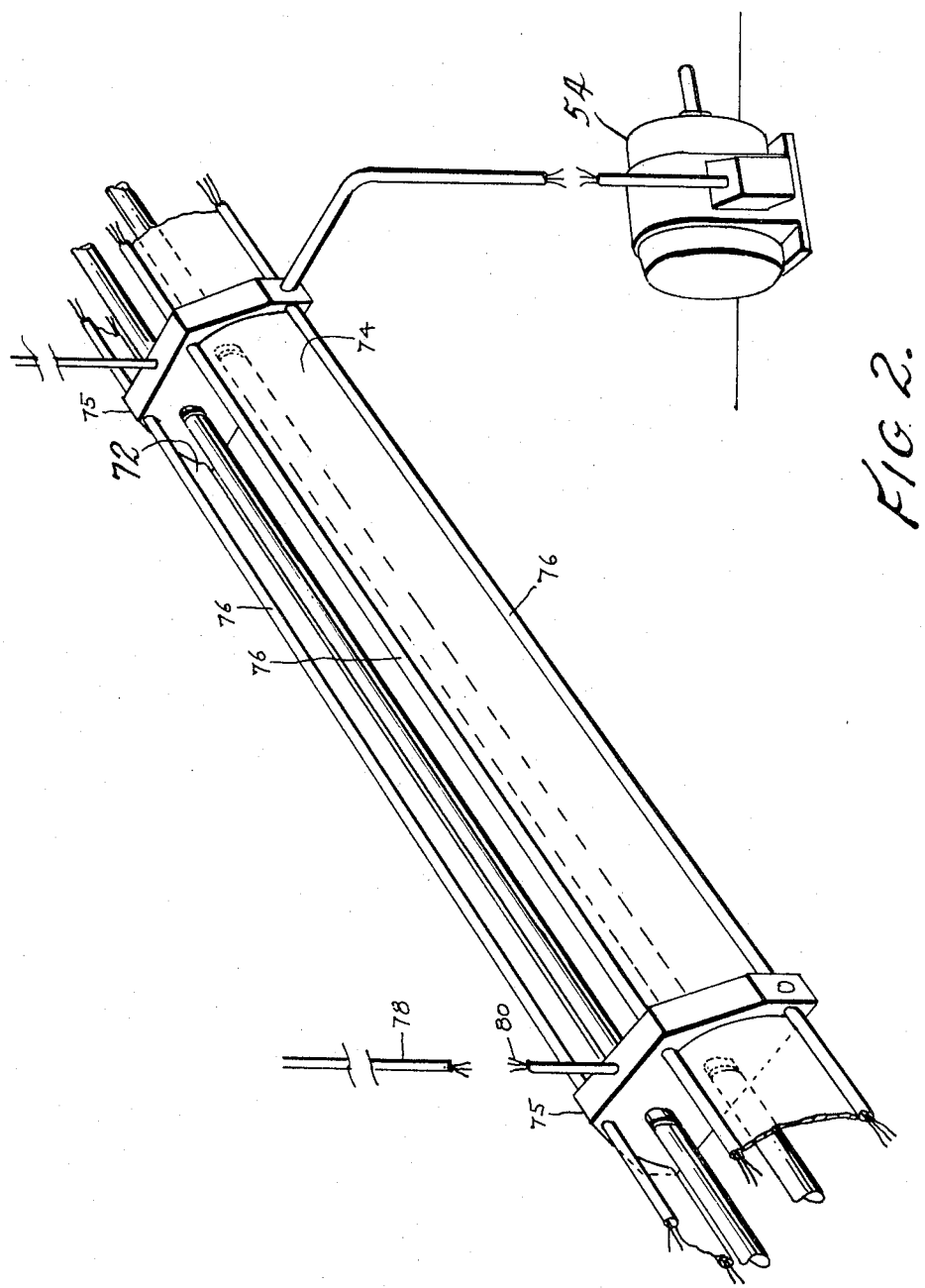

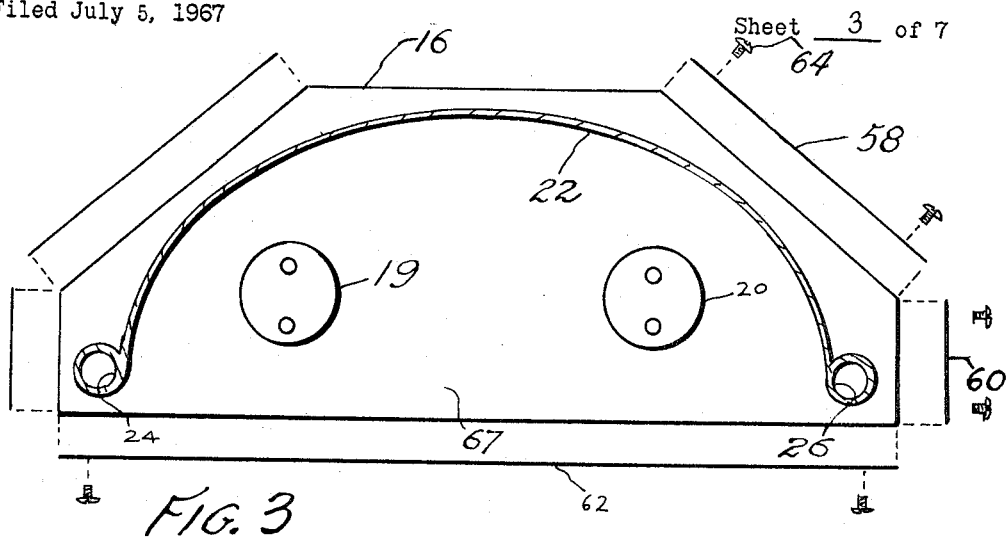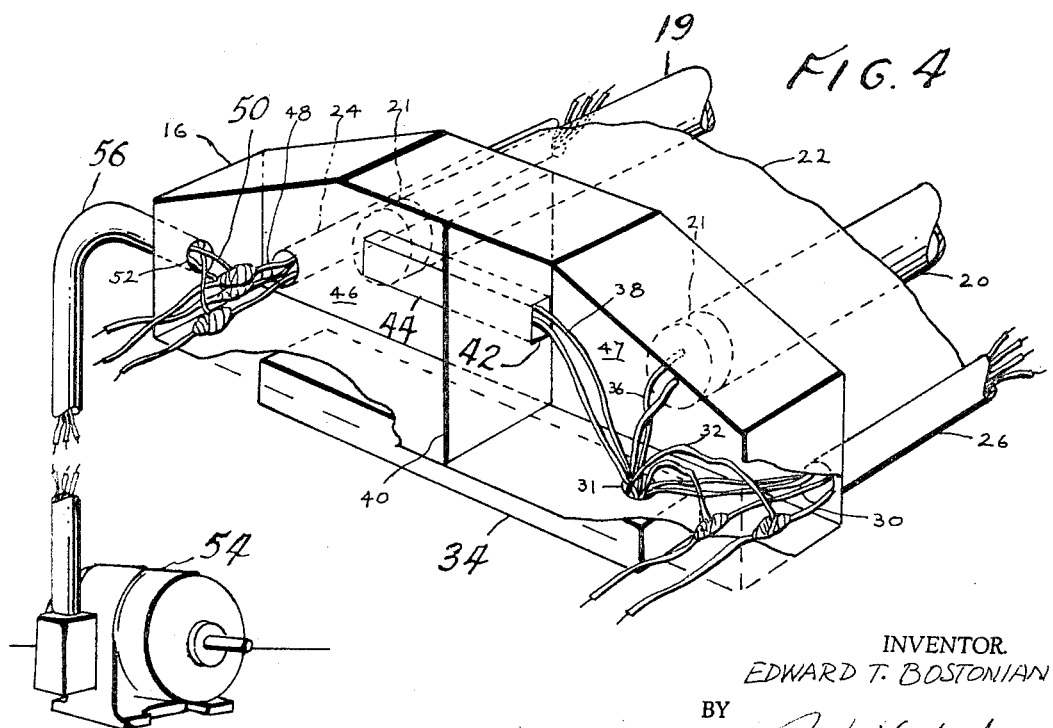

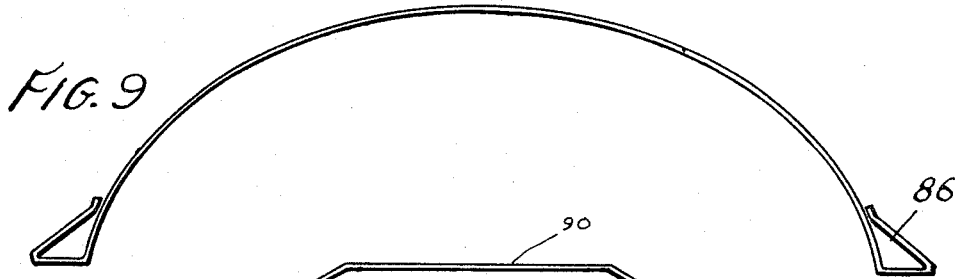
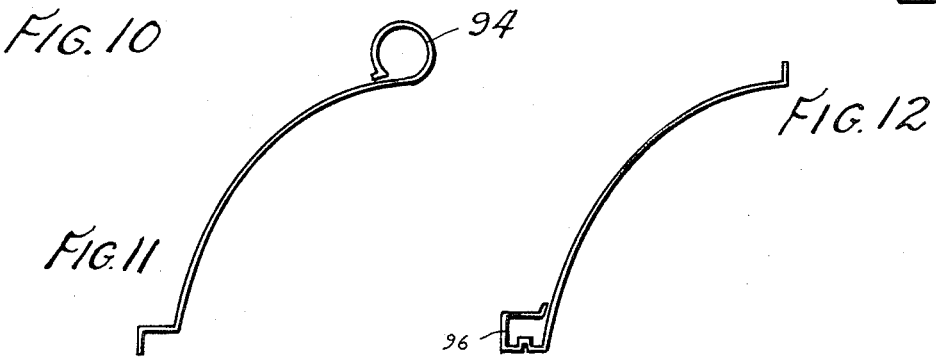
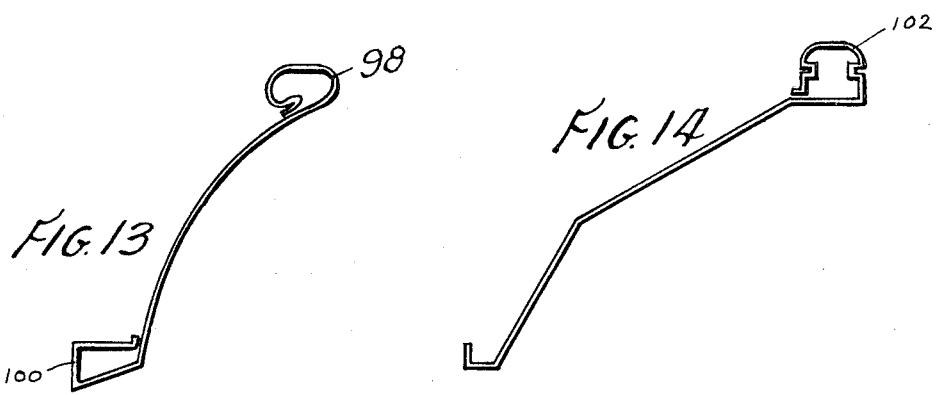

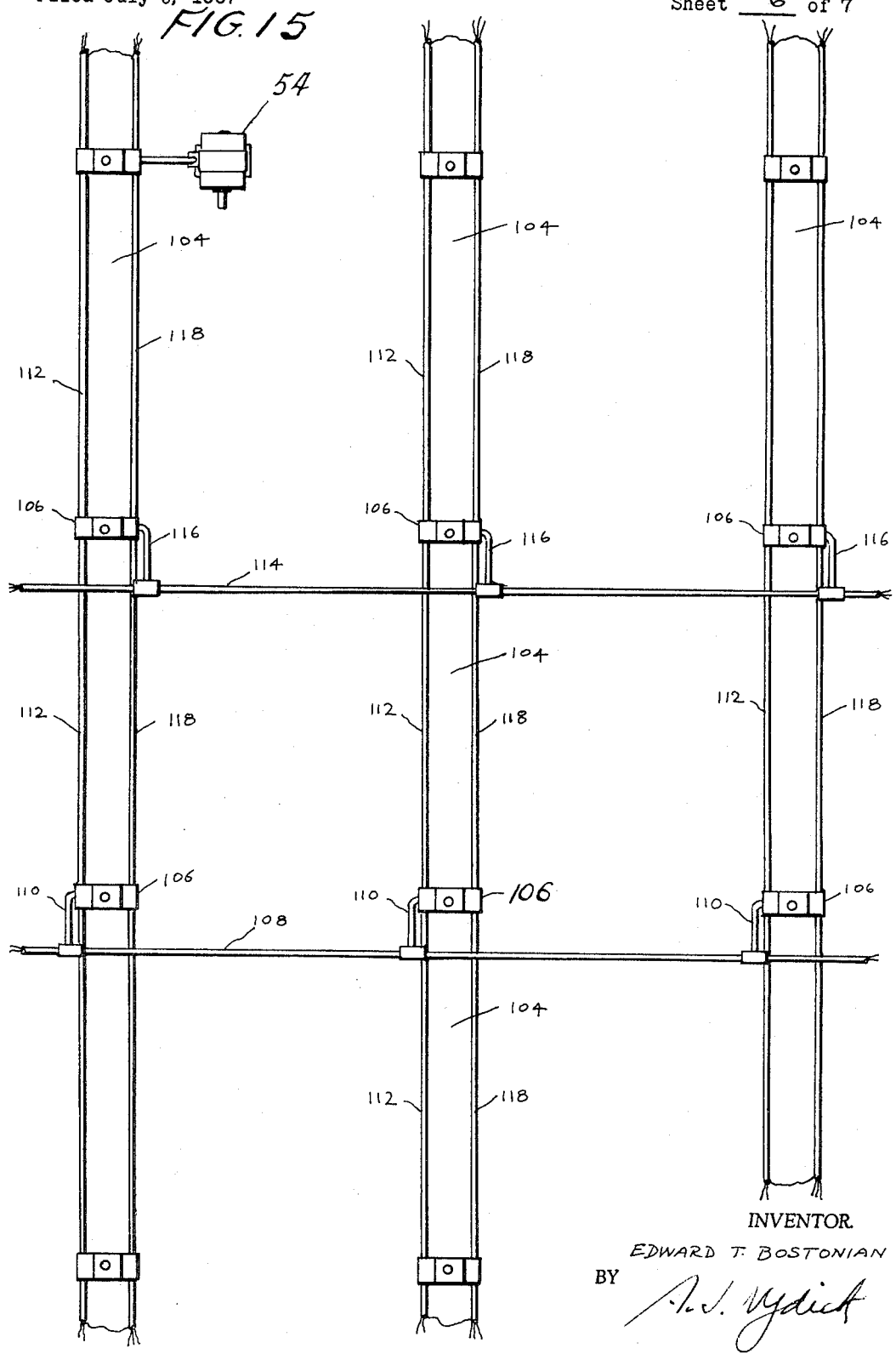

United States Patent Office 3,436,537
Patented Apr. 1, 1969

3,436,537
FLUORESCENT LIGHTING FIXTURE WITH WIREWAYS ON THE REFLECTOR
Edward T. Bostonian, 3522 15th Ave., Brooklyn, N.Y. 11218
Continuation-in-part of application Ser. No. 274,719, Apr. 22, 1963. This application July 5, 1967, Ser. No. 651,248
Int. Cl. F21s 3/14
U.S. Cl. 240—9                                    15 Claims

ABSTRACT OF THE DISCLOSURE

A lighting fixture with one or several straight lighting tubes and one or several correspondingly shaped reflectors supported by and between two junction boxes. Connections between circuit components in or on the two boxes such as sockets, wire terminals, etc., are effected by wires extending through one or several conduits along the longitudinal edges of the reflectors. Some of the conduits may be used to house wires for carrying light current, and others to house wires carrying power current.

---

This application is a continuation-in-part application based upon my co-pending application Ser. No. 274,719 filed Apr. 22, 1963, and now abandoned.

The present invention relates to lighting fixtures, and more particularly to fluorescent lighting fixtures which may be individually used or in tandem to provide a relatively long line of fluorescent lighting.

There are known fluorescent lighting fixtures of the general kind above referred to, the reflectors of which are mounted on and between a pair of junction boxes. The junction boxes serve to accommodate some of the circuit components of the fixtures such as lamp sockets, terminals for making connections to the lamp sockets and for connection to an external source of supply of current. The wires required for interconnecting the two junction boxes of a lighting fixture and for connecting one fixture to a second fixture are generally extended through special housings secured in some fashion to the frame structure of the fixture. The need for such housings and the resulting arrangement of the wires complicate the construction of the entire fixture; it makes the same heavy and bulky and it increases the assembly costs thereof.

Fluorescent lighting fixtures are highly competitive items, and accordingly it is very desirable to produce such fixtures as simply and inexpensively as possible.

In industrial plants it is customary practice to use elongated fluorescent lighting fixtures to illuminate machine tools and other types of electric power equipment and also assembly lines, by suspending the lighting fixtures above or otherwise close to the areas to be brightly illuminated. The disposition of the electric wiring required for the power equipment frequently presents space problems, often aggravated by the prevailing Underwriters' requirements as to safety, insulation and location of power lines.

It is a broad object of the invention to provide a novel and improved lighting fixture of the general kind above referred to in which the need for special wire housings is eliminated and the arrangement of the required circuitry is greatly simplified, thereby correspondingly simplifying the total structure of the fixture and the assembly costs thereof.

It is another broad object of the invention to provide a novel and improved lighting fixture of the general kind above referred to in which are accommodated not only the circuitry required for the lighting current, but also circuitry for other purposes such as lines for power current, thereby greatly simplifying the problem of supplying current to power equipment disposed close to the lighting fixture for illumination thereby.

A more specific object of the invention is to provide a novel and improved lighting fixture of the general kind above referred to in which the reflector of the fixture is directly utilized as carrier for wire connections between the two junction boxes of the fixture.

Another more specific object of the invention is to provide a novel and improved lighting fixture, the reflector of which has along one or several of its longitudinal edges a peripherally closed conduit through which extend the connections between the two junction boxes and to an outside current supply source, and which additionally constitute reinforcing ribs for the reflectors.

A further more specific object of the invention is to provide a novel and improved lighting fixture of the general kind above referred to, the reflector of which has a conduit along each of its two longitudinal edges, one of said conduits accommodating wires for lighting current and the other accommodating wires carrying power current, and the junction boxes of which are subdivided to accommodate in one compartment the feeder circuitry required for the lighting system, and in another compartment feeder circuitry required to supply power equipment. The respective circuitries in the two boxes are connected by the wires extending through the conduits.

Other and further objects, features and advantages of the invention will be pointed out hereinafter and set forth in the appended claims constituting part of the application.

In the accompanying drawing, several preferred embodiments of the invention are shown by way of illustration and not by way of limitation.

In the drawing:

FIG. 1 is a perspective view looking from beneath and from one side of a lighting fixture constructed according to the present invention;

FIG. 2 is a perspective view looking from above and from one side of an alternate embodiment of a lighting fixture constructed according to the present invention;

FIG. 3 is a cross-sectional view taken along line 3—3 of FIG. 1 but with the covers and the screws for the junction box covers being displaced from their normal secured position;

FIG. 4 is a perspective view of one of the junction boxes of the lighting fixture of FIG. 1;

FIGS. 6 to 14 are various alternate embodiments of reflectors and conduits formed thereon.

FIG. 15 is a partial plan view of a plurality of lighting fixtures, some of which are arranged end to end and others generally parallel to one another to form rows and showing a feeder conduit with branches to the rows of fixture conduits for the wires of the lighting circuits and a separate, similar arrangement for the wires of the power circuit.

Figure 5:
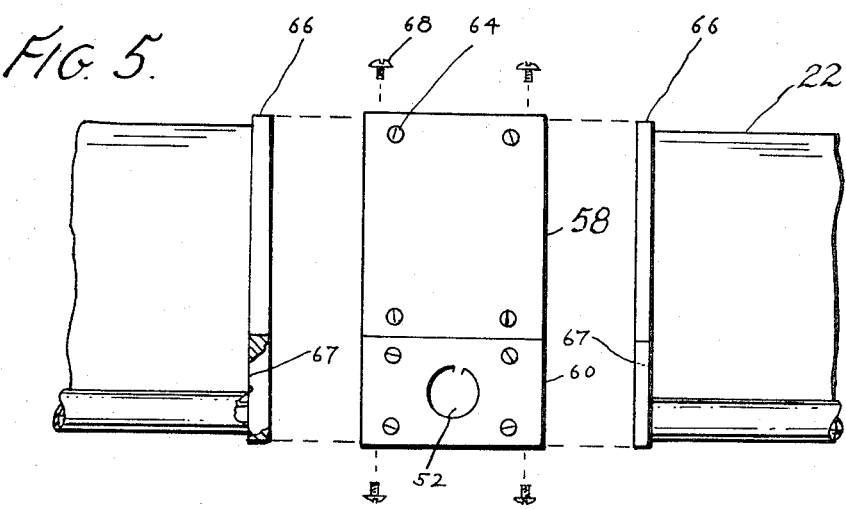
FIG. 5 is a diagrammatic side view of the junction box of the lighting fixture of FIG. 1 showing two lighting fixtures disposed laterally of and in alignment with the junction box before they are assembled.

Referring now to the drawings more in detail, there are shown in FIG. 1 three elongated fluorescent lighting fixtures 10, 12, and 14 (12 being shown in full, 10 and 14 being only partially shown) arranged end to end and joined by support means in the form of junction boxes 16 and 18 which may be open or closed boxes, or be in the form of a frame structure. Any number of such fixtures may be arranged end to end and joined by junction boxes to provide any desired length of fluorescent lighting. Since each fixture and each junction box in the length of fluorescent lighting are substantially the same; only the fixture 12 and the junction box 16 will be described in detail.

As can be seen in FIG. 1, the fixture 12 comprises a pair of straight fluorescent tubes or lamps 19 and 20 supported at both ends in conventional sockets 21 carried by the junction boxes 16 and 18. Extending above these lamps 19 and 20, there is an elongated curved reflector 22 which is supported at both ends by the junction boxes 16 and 18 by means to be hereinafter described. As can best be seen in FIG. 3, the reflector 22 has an arcuate cross-section and is provided with a suitable surface for diffusing and reflecting the light from the fluorescent lamps. Disposed along the longitudinal edges of the reflector are hollow conduits 24 and 26. The conduits have a circular cross-section. However, as will be fully explained hereinafter, many other cross-sectional configurations of the conduits may also be used.

As shown in FIG. 3, the conduits are integral with the reflector which is generally made of sheet material of suitable gauge by bending over a marginal strip of the reflector by any techniques suitable for the purpose. The edges of the sheet material are suitably sealed to the wall of the reflector proper, for instance, by welding or soldering, or by any other technique suitable for the purpose. In this connection, it is pointed out that the conduits, whatever cross-sectional configuration they may have, must be tightly closed along the length thereof according to present Underwriters' requirements, and in any event, tight lengthwise closing of the conduits is desirable to protect wiring therein against the ingress of dust and moisture. Tightly closed or sealed conduits along longitudinal edges of the reflector may also be produced by extrusion of metal or plastic.

The two conduits are extended into junction boxes 16 and 18 in open communication therewith. Both conduits carry electric wires, conduit 26 accomodating wires 30 and conduit 24 wires 48. Moreover, the conduits constitute reinforcing ribs for the reflector to stiffen the same.

As can best be seen in FIG. 4 which shows junction box 16, the wires 30 carried in conduit 26 are part of the feed circuit providing electrical current to the lamps 19, 20. Suitable lead wires 32 extend from wires 30 through an opening 31 in the junction box 16 to a ballast 34 of conventional structure carried by the junction box below the botom wall thereof. From the ballast 34, a pair of electrical lead wires 36 extend to socket 21 of lamp 20 and another pair of lead wires 38 extend from the ballast 34 to the socket 21 of lamp 19. As is indicated, terminals of wires 30 may be connected to wires 30a leading to an external supply source or to a junction box of the second lighting fixture. For reasons which will presently be set forth, a partition wall 40 divides the junction box 16 into two separated compartments 46 and 47. The wall 40 has an opening 42, and a hollow channel member 44 extends through opening 42 close to socket 21 of lamp 19 for housing the lead wires 38 leading to the socket 21 of lamp 19.

Junction box 18 is constructed similar to box 16 and should be visualized as carrying the corresponding circuit components and wiring in its compartment 47. The circuit components and the wiring in the two compartments 47 are connected by wires 30 extended through conduit 26.

Compartment 46 is utilized to accommodate wires other than those used in the circuitry supplying electrical current to the lamps. As mentioned before, Underwriters' requirements are such that the wires of a lighting circuit must be isolated by partition walls from the wires of another circuit such as a power circuit supplying electrical current to electric motors or other power devices. As can be seen, compartment 46 of the junction box 16 is isolated from the remainder of the junction box by the wall 40 and the channel member 44 so that wires of an additional circuit, other than the lighting circuit for the fluorescent lamps, may safely be carried in compartment 46. In this regard, it is pointed out that any suitable wall member or enclosure may be used to provide an isolated area for the aforementioned purpose. For example, referring to FIG. 4, the wall 40 may be shifted to the left of the socket 21 of lamp 19, thereby eliminating the necessity for the channel member 44 while still providing the required isolated space.

Compartment 46 of the junction box 16 is in communication with the conduit 24 and accordingly, feed wires 48 extended through the conduits 24 of fixtures on either side of the junction box may be joined to one another in the compartment 46 of each junction box so that a continuous electrical conductor along the length of the plurality of end-to-end fixtures is provided. Suitable lead wires 50 may extend from terminals of wires 48 in the compartment 46 of the junction box and externally of junction box 16 through a knock-out opening 52. Wire leads 50 may also be used for supplying electrical current to any electrical device. In FIG. 4, the wires 48 and lead wires 50 have been illustrated as part of a power circuit supplying electrical current to an electric motor 54 through a shielded cable 56.

As is now evident, the power supply wires 48 extended through conduit 24 into compartments 46 of junction boxes 16 and 18 and the power leads 50 in the compartment 46 of the junction box 16, are electrically and physically isolated from the lighting circuit wires carried in conduit 26 and compartments 47 of the junction boxes. Any number of fixtures may be arranged end-to-end and joined by junction boxes while still maintaining the required separation of the two circuit systems.

If desired, suitable subdivisions in the compartments may be provided to facilitate making the electrical connections between the wires and other components in the junction boxes through the conduits. A plurality of knock-out plugs may be made part of the junction boxes to provide for suitable conduit connections with various circuit components of the fixtures.

As shown in FIG. 3, access to the junction box may be had by removable panels or covers, such as at 58, 60 and 62, suitably secured to the junction box as by the screws 64. The lamp sockets 21, FIG. 4, may be mounted in openings in the sides 67 of the junction box with suitable fastening means.

In FIG. 5, a partial arrangement (in exploded illustration) of components constituting a junction box comprises sides 67 with stiffening and fastening flanges 66, covers 58 and 60 and screws 68 for fastening flanges 66 to top cover 16 (FIG. 3) which constitutes the coupler for the assembly. 52 is representative of knockout openings for conduit or other attachments. Fixtures may be hung from the ceiling of a building by support members 70 (FIG. 1), which could also be electrical conduit feeders as required, extending upwardly from the junction boxes.

In an alternate embodiment as shown in FIG. 2, a pair of elongated reflectors 72 and 74 of arcuate cross-section are provided instead of the one shown in the embodiment of FIG. 1. Each reflector 72 and 74 has two conduits 76 along substantially the longitudinal edges thereof, thereby providing a total of four conduits in the lighting fixture. Accordingly, one or more of the conduits 76 may carry the wires of the lighting circuit and one or more conduits may carry the wires for other circuits as desired, such as for example, for a power circuit supplying electrical current to motor 54. Suitable wall members or enclosure means (not shown) are provided within junction boxes 75 (FIG. 2) to separate the wires and circuit components of the various circuits therein. Overhead supports such as a pipe 78 may be employed for supporting the junction boxes 75 and these pipes 78 may also house wires 80 leading to the junction boxes. If desired, the ballast of the fluorescent lamps may be supported by the pipe 78 at a location remote from the junction boxes.

Figure 6:
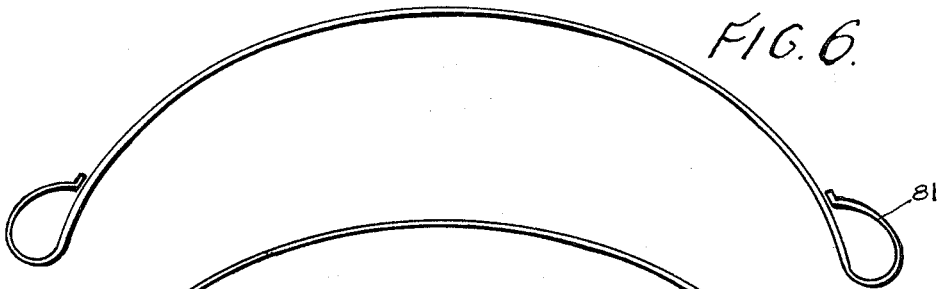
Figure 7:
Figure 8:

The hollow conduits along the longitudinal edges of the reflectors, whether it be the reflectors used in the lighting fixture of FIGS. 1 or 2, may have any suitable cross-section as previously stated. For example, the cross-section may be round, square, triangular, ellipsoid, or any combination or variation of these or other shapes. The conduit may be formed integral with the reflector such as by bending or rolling back the edge of the reflector material as shown at 81 in FIG. 6 and securing the bent or rolled-over edge such as by continuous or spot welding or by the use of other suitable fastening means. The conduits may be formed by suitably securing a separate channeled member, such as the arcuate member 82 in FIG. 7 or the dished member 84 in FIG. 8, to the reflector. The conduits may also be formed by bending the longitudinal edges into a generally triangular shape such as shown at 86 in FIG. 9. Instead of an arcuate cross-section, the reflector may be formed to define a plurality of intersecting flat surfaces such as is the case of the reflector 90 in FIG. 10. The reflector 90 is shown as having integrally formed conduits 92 of a generally rectangular configuration.

Whereas the reflectors of FIGS. 6 to 10 are suitable for use with a lighting fixture of the type shown in FIG. 1, the reflectors of FIG. 11 to 14 are suitable for use in a lighting fixture of the type shown in FIG. 2. These latter groups of figures illustrate various other cross-sectional shapes of the conduits, such as the circular conduit 94 of FIG. 11, the generally square and indented conduit 96 of FIG. 12, the arcuate conduit 98 and the generally trapezoidal conduit 100 of FIG. 13, and the doubly indented conduit 102 of FIG. 12. In all shown embodiments, the conduits should be visualized as being tightly sealed, for instance, by welding or soldering.

As stated before, the closed hollow conduits, in addition to serving as wireways, also increase the strength of the reflector. In this regard, it is pointed out that the reflectors may be relatively long, up to ten feet for example and are often made of a relatively thin material, such as light gauge sheet metal. The increased strength of the reflector permits, if desired, attachment of the ceiling support to the conduit with a suitable hanger fitting (not shown). Since many reflectors are porcelain enameled, the closed hollow conduits reduce the possibility of chipping of this type of finish at the longitudinal edges of the reflector, particularly as compared to conventional reflectors having free longitudinal edges. Also, the conduits of the present invention, since they are closed off, reduce dust or dirt contribution to a working area, this later feature being particularly critical in many precision operations.

As can be seen in FIG. 15, a plurality of lighting fixtures 104 may be joined to one another at their ends by the junction boxes 106 to form rows of fluorescent lighting. These fixtures 104 and junction boxes 106 may be of the type shown in FIGS. 1 or 2. An electrical conduit 108 extends transversely of the rows of lighting adjacent one transverse group of junction boxes 106; and this conduit 108 is connected to lead-in conduits 110, each of which leads to the same side of the said transverse group of junction boxes 106. Accordingly, electrical conductors through the conduits 108, 110 may be led into the junction boxes and connected to conductors in conduits 112 on one side of the lighting fixture thereby to provide the lighting circuit for the lamps in the lighting fixtures. Similarly, a second transverse conduit 114 may be provided along with lead-in conduits 116, all of which lead to the same side, but opposite to the aforementioned same side, of the junction boxes as shown. These conduits 114 and 116 may house electrical conductors connected to wires in a conduit 118 in the reflectors of the lighting fixtures thereby to provide a power circuit supplying electrical current to devices other than lamps, such as motor 54.

It will be evident from the foregoing that the lighting circuit and power circuit shown in FIG. 15 are isolated from one another in that the electrical wires are carried in separate isolated conduits (each for its own service) and constituting a part of the reflector; and in the junction boxes at the ends of the lighting fixtures.

Figure 16:
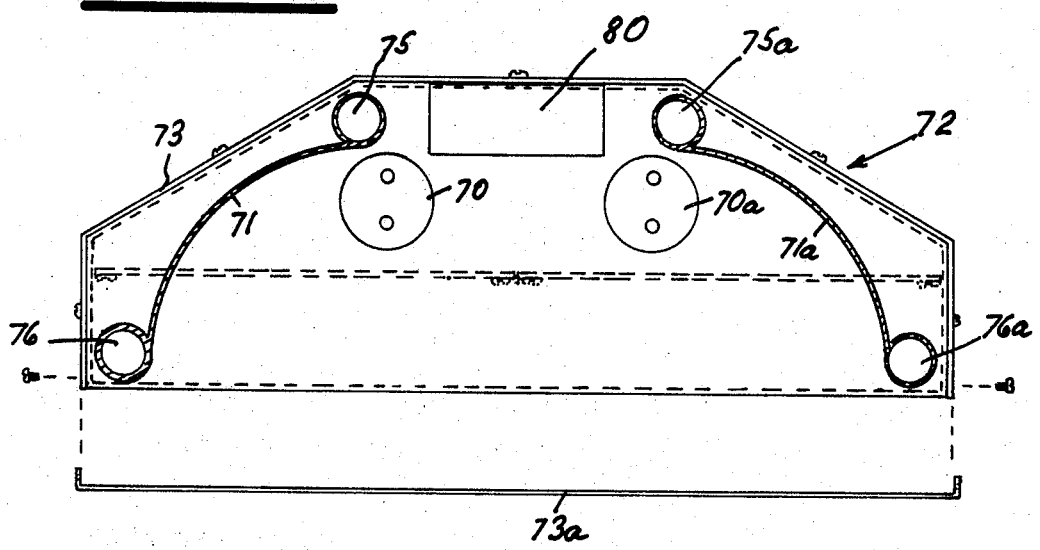
FIG. 16 is a diagrammatic end view, partly in section, of a further modification of a lighting fixture according to the invention.
Figure 17:
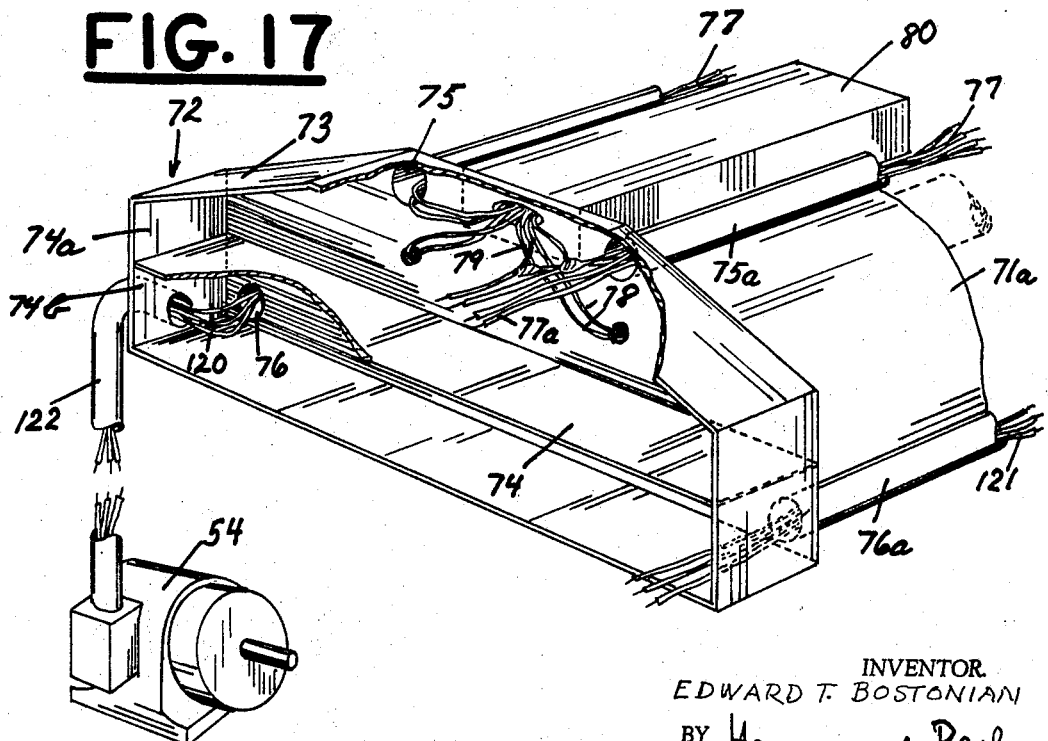
FIG. 17 is a fragmentary perspective end view, partly broken open, of the lighting fixture according to FIG. 16.

Turning now to FIGS. 16 and 17, these figures show a lighting fixture designed for two tubes, sockets for which are indicated at 70 and 70a. The fixture is equipped with two arcuate reflectors 71 and 71a of conventional design. The reflectors are secured at each end in junction boxes 72. Each of the junction boxes (only one of the boxes being shown), has a casing 73 of conventional structure and outline and may have removable panels as is indicated by a detached panel 73a. The casing is divided by a partition wall 74 into an upper compartment 74a and a lower compartment 74b.

The two reflectors have peripherally closed hollow conduits 75, 76 and 75a and 76a along their longitudinal edges. Instead of the illustrated circular shape, the conduits may be designed in accordance with structures such as shown in FIGS. 11 through 14.

As is clearly shown in FIG. 17, conduits 75 and 75a lead into upper compartment 74a and conduits 76 and 76a lead into lower compartment 74b.

The two upper conduits accommodate wires 77 for the lighting current. The wires are connected within compartment 74a to sockets 70 and 70a by branched off terminals of wires 78 and by other branched off terminals of wires 79 to a ballast 80 supported by the frame structure of the fixture. The connection to an outside power supply or to a second lighting fixture may be made via wires 77a. The details of the wire connections do not constitute part of the invention, and are hence not shown and described in greater detail.

As can be seen in FIG. 17, ballast 80 is disposed between the upper longitudinal edges of the reflectors which are spaced apart from each other in parallel relationship so that a certain percentage of the light from the reflector will be directed upwardly.

The two lower conduits 76 and 76a which open into lower compartment 74b accommodate power wires 120 and 121. Wires 120 are led out through a connector sleeve 122 and are shown as being connected to motor 54 shown as type of power equipment. Wires 121 may be visualized as leading from junction box 72 to the second junction box (not shown) of the fixture and also to a junction box of a second lighting fixture, or to an external source of power.

As is now evident, all the wiring connections between the two junction boxes of a fixture are carried by the conduits formed on the reflectors themselves and are fully shielded. Moreover, the structure of the junction boxes in conjunction with the conduits formed on the reflectors permits the carrying of both lighting wires and power current wires on the lighting fixture without mutual interference and in full compliance with all safety regulations.

Obviously, the junction boxes may be subdivided into more than two compartments. For instance, four compartments may be provided in each box, each of said compartments communicating with one of the conduits. One compartment of each box and the respective conduit may then accommodate the lighting circuit, another one power circuitry, the third one control or signal circuits and the fourth one telephony circuits.

While the invention has been described in detail with respect to certain now preferred examples and embodiments of the invention, it will be understood by those skilled in the art, after understanding the invention, that various changes and modifications may be made without departing from the spirit and scope of the invention, and it is intended therefore, to cover all such changes and modifications in the appended claims.

What is claimed is:

1. A lighting fixture arrangement comprising a plurality of spaced support means, elongated lamps and reflectors disposed between and joined to pairs of spaced support means for support by the same, said reflectors having hollow peripherally sealed conduits along substantially at least one longitudinal rim thereof housing electrical conductors, each of said conduits constituting a shielded wireway and a reinforcing rib for the respective reflector, said support means having openings in communication with said conduits such that said electrical conductors extend from the conduits of reflectors on opposite sides of a particular support means through said openings to the interior of said support means, said electrical conductors extending through said openings being electrically joined to one another within said support means, and connecting means at least partially in said support means providing an electrical connection between said electrical conductors and said lamps.

2. A lighting fixture arrangement as set forth in claim 1 wherein said connecting means comprises a ballast supported by said support means, and electrical conductors extending from the ballast to the lamps and from the ballast to the electrical conductors leading from said conduits.

3. A lighting fixture arrangement as set forth in claim 1 wherein said support means are formed as generally hollow junction boxes, said junction boxes including detachable panels providing access to the interior thereof, and including means joining the ends of said reflectors and lamps to the junction boxes.

4. A lighting fixture comprising spaced support means, elongated lamps extending between and supported by said support means, an elongated reflector adjacent said lamps and joined to said support means, said reflector having a hollow peripherally sealed conduit along substantially each longitudinal edge thereof, each of said conduits constituting a shielded wireway and a reinforcing rib for the respective reflector, one of said conduits housing electrical conductors running between said support means and being electrically connected to said lamps, the other of said conduits housing other electrical conductors running between said support means and electrically connected to electrical devices other than said lamps, said support means comprising enclosure means isolating the electrical conductors extending from said one conduit from the electrical conductors extending from said other conduit.

5. A lighting fixture as set forth in claim 4 wherein said other electrical conductors are led externally of said support means to complete an electrical circuit which is isolated from the circuit in which said lamps are connected.

6. A lighting fixture as set forth in claim 4 wherein said other electrical conductors are led externally of said support means to complete a power circuit having electric power devices connected therein.

7. A lighting fixture comprising spaced support means, elongated lamps extending between and supported by said support means, elongated reflectors adjacent said lamps and joined to said support means, said reflectors having conduits along substantially the longitudinal edges thereof, at least one of said conduits housing electrical conductors of an electrical circuit in which said lamps are connected, other of said conduits housing other electrical conductors of electrical circuits other than the said circuit in which the lamps are connected, said support means comprising enclosure means isolating the electrical conductors of the said circuits as such electrical conductors pass through said support means.

8. A lighting fixture arrangement comprising a plurality of rows of lighting fixtures, each of said rows being comprised of a plurality of elongated lighting fixtures arranged in end to end relationship, each of said lighting fixtures being comprised of elongated lamps and a reflector adjacent said lamps, support means joined to the longitudinal ends of said lamps and reflectors, said reflectors having hollow conduits formed along substantially the longitudinal edges thereof, said conduits being in communication with an interior portion of said support means, means in said support means dividing the latter into at least two sections each isolated from one another, one of said conduits of each reflector of a row of lighting fixtures housing electrical conductors which pass through one of said isolated sections of the support means in a row of lighting fixtures to define in part the lighting circuit for the lamps in one row of lighting fixtures, the other of said conduits of each reflector of a row of lighting fixtures to define in part a circuit for electrical devices other than the said lamps, means electrically connecting the electrical conductors of said one conduit of each row of lighting fixtures, and means electrically connecting the electrical conductors of said other conduit of each row of lighting fixtures.

9. A lighting fixture for tube-shaped lamps comprising in combination:
  an elongated reflector having along one of its longitudinal edges a hollow peripherally sealed conduit constituting a shielded wireway and a reinforcing rib for the reflector;
  a pair of junction boxes, said reflector being secured at each end to one of said junction boxes opening into the same;
  circuit components supported by each of said junction boxes; and
  conductor wires extending from the circuit components supported by one of the junction boxes through said conduit to the circuit components supported by the other of said junction boxes.

10. The lighting fixture according to claim 9 wherein a marginal strip of the reflector along said one longitudinal edge is turned over to form said hollow conduit as an integral part of the reflector, the lengthwise rim of the turned-over strip being fixedly sealed to the main portion of the reflector.

11. The lighting fixture for tube-shaped lamps comprising in combination:
  an elongated reflector means having along each of its longitudinal edges a hollow peripherally closed conduit, each of said conduits constituting a shielded wireway and a reinforcing rib of the reflector;
  a pair of junction boxes, each including a partition dividing the respective box into two compartments, said reflectors being secured on each end to said junction boxes, one of said conduits opening into one compartment of each box and the other conduit into the other compartment of each box;
  circuit components disposed in each compartment of the junction boxes; and
  wire conductors extending through said conduits and connecting the circuit components in one compartment of one box with the circuit components in one compartment of the other box and the circuit components in the other compartment of said one box with the circuit components in the other compartment of said other box.

12. The lighting fixture according to claim 11 wherein the circuit components in said one compartment include lamp terminals connected by the respective wire conductors in said one conduit in a lighting circuit, and the circuit components in said other compartments include power terminals connecting external power equipment in circuit by the wire conductors in said other conduit.

13. The lighting fixture according to claim 11 wherein marginal strips along the longitudinal edges of said reflector are turned over to form said hollow conduits as integral parts of the reflector, the lengthwise rim of each turned over strip being fixedly sealed to adjacent wall portions of the reflector.

14. The lighting fixture according to claim 11 wherein a channeled member is fixedly sealed to each longitudinal edge of the reflector to form said hollow conduits.

15. The lighting fixture according to claim 11 wherein a second reflector is secured to said junction boxes spaced apart from and facing the first reflector in parallel relationship therewith, said second reflector also having along each of its longitudinal edges a hollow peripherally closed conduit, the two conduits on two adjacent longitudinal edges of the reflectors both opening into one of the compartments of each junction box and the two conduits on the other longitudinal edges of the reflectors both opening into the other compartment of each box, the circuit components in said one compartment being connected by wire conductors extending through the two conduits of said adjacent edges of the reflectors and the circuit components in said other compartments being connected by wire conductors extending through said other two conduits.

References Cited

UNITED STATES PATENTS

| 3,158,327 | 11/1964 | Dameral | 240—9 |
| 3,192,380 | 6/1965 | Eglowstein | 240—51.11 |
| 3,210,538 | 10/1965 | Picha et al. | 240—51.11 XR |

NORTON ANSHER, *Primary Examiner.*

J. F. PETERS, JR., *Assistant Examiner.*

U.S. Cl. X.R.

240—51.11